UNITED STATES PATENT OFFICE.

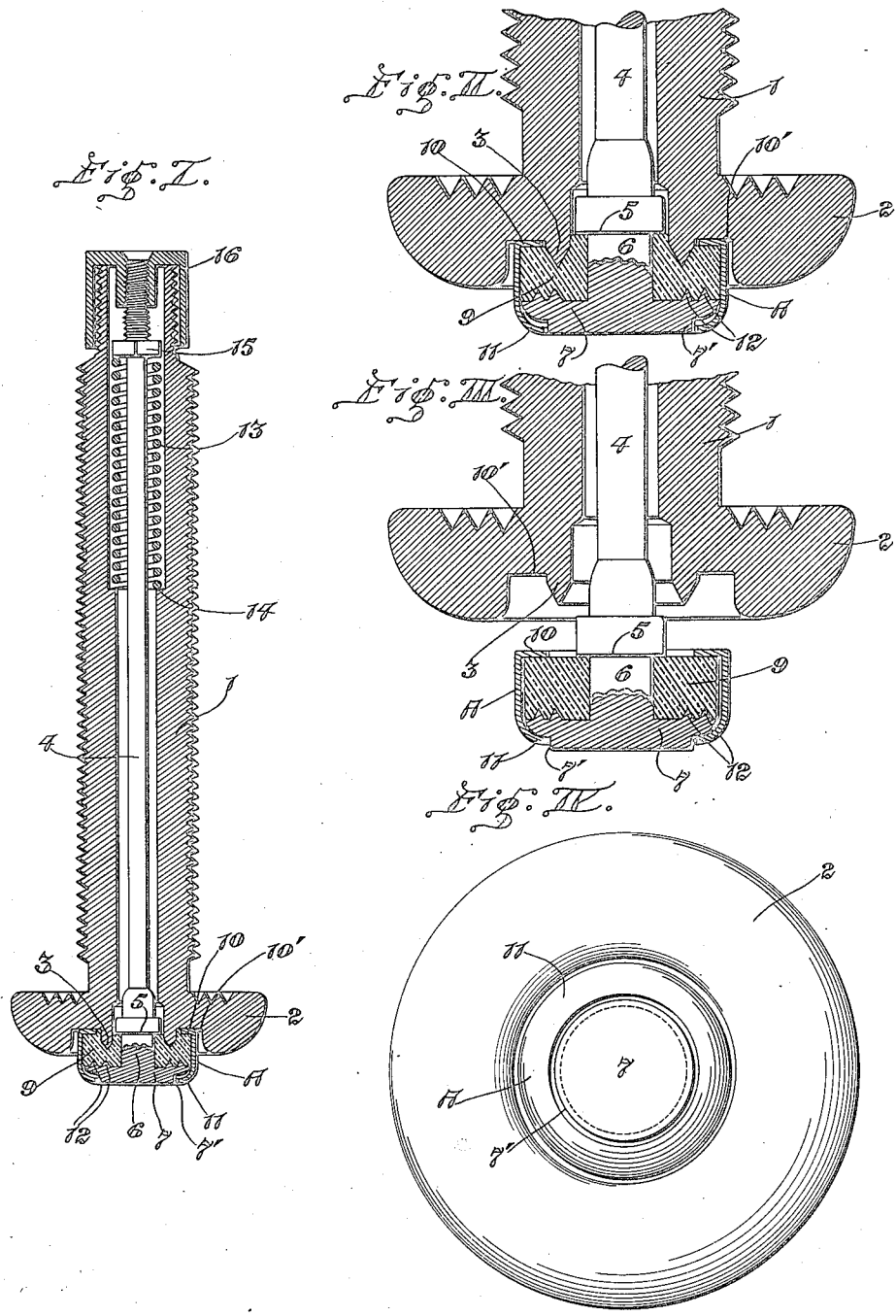

HARRY E. HARDER, OF ST. LOUIS, MISSOURI, ASSIGNOR OF ONE-HALF TO WILLIAM F. LESCHEN, OF ST. LOUIS, MISSOURI.

VALVE.

1,372,878.  Specification of Letters Patent.  Patented Mar. 29, 1921.

Application filed June 23, 1919. Serial No. 307,344.

*To all whom it may concern:*

Be it known that I, HARRY E. HARDER, a citizen of the United States of America, a resident of the city of St. Louis, in the State of Missouri have invented certain new and useful Improvements in Valves, of which the following is a full, clear, and exact description, reference being had to the accompanying drawings, forming a part of this specification.

My invention relates to improvements in valves, and the device I have shown to illustrate the preferred form of the invention is a check valve adapted for use in pneumatic tires. The device herein shown includes a yielding gasket, preferably made of rubber, and adapted to be firmly forced onto a valve seat.

Prior to this invention, valve devices have been provided with yielding rubber gaskets which contact with the valve seats, but such devices have not been entirely satisfactory, for the pressure to which the rubber gaskets are subjected results in distortion, displacement and mutilation of the rubber, all of which tends to rapidly destroy the efficiency of the rubber gaskets. Furthermore, it has been difficult to properly secure the rubber gaskets to the means whereby they are forced into and out of engagement with the valve seats.

One of the objects of this invention is to provide a highly efficient means for protecting the yielding gaskets from the injurious effects of compressive stresses which ordinarily mutilate and destroy the gaskets in a short time. The yielding gasket, preferably made of rubber, is closely confined in a shell or ring which prevents circumferential expansion of the rubber, thereby protecting the rubber from injurious mutilation. When the yielding gasket is firmly forced onto its seat, the rubber tends to spread or expand circumferentially of the gasket, but such expansion and mutilation is prevented by the relatively firm confining ring which contacts with the periphery of the rubber. By preventing undue mutilation of the yielding gasket, its efficiency will be maintained for a very long period of time.

Another object is to produce a valve device of this kind having a pressure member whereby the yielding gasket is very effectively forced onto its seat. In the preferred form of the invention this pressure member is surrounded by the ring in which the gasket is confined, and said pressure member is movable relative to said ring to constitute a plunger whereby the confined gasket is firmly pressed onto its seat. Although the pressure member is surrounded by the ring containing the yielding gasket, said pressure member is preferably exposed to the fluid pressure tending to close the valve.

A further object is to confine the yielding gasket in such a manner that it can be positively forced into and out of engagement with its seat. This is desirable for the reason that the gasket will usually tend to adhere to the seat after it has been forced there under pressure.

With the foregoing and other objects in view, the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a longitudinal section of a check valve device embodying the features of this invention.

Fig. II is an enlarged section of the lower portion of the device, showing the valve in its closed position.

Fig. III is a view similar to Fig. II, showing the valve in its open position.

Fig. IV is an inverted plan view of the device shown in Fig. III.

1 designates an externally threaded tube, provided at its lower end with a flange 2 adapted to be secured inside of a pneumatic tube. A sharp annular rib 3 extends from the lower end of the tube 1 to provide a sharp annular valve seat. 4 designates a valve stem movable longitudinally in the tube 1 and having a shoulder 5 adjacent to the valve seat. The stem is also provided with a neck 6 extending from the shoulder 5, and a pressure exerting head 7 secured to the end of said neck.

The valve member is preferably in the form of an annular rubber gasket 9, surrounding the neck 6 and engaging the shoulder 5 and pressure head 7. The pressure head faces the valve seat 3, and the gasket 9 is interposed between said head and valve seat.

A designates a confining ring, or shell, surrounding the head 7 and gasket 9 and contacting with the peripheral face of said gasket to prevent circumferential expansion of the yielding gasket. The confining ring A is provided with inturned marginal flanges 10 and 11 between which the head 7 and gasket 9 are confined, the flange 10 constituting an annular abutment adapted to engage similar abutment 10' formed around the valve seat 3, and the flange 11 being adapted to engage the head 7. The yielding gasket 9 contacts with the inner face of the abutment flange 10 and also with the head 7. 12 designates anchoring ribs formed on the head 7 and extending into the gasket. To protect the pneumatic tube (not shown) from the sharp edge of flange 7, the head 7 is provided with a circular boss 7' which extends into the circular space formed by the flange 11.

A spring 13 (Fig. 1) mounted in the tube 1 lies between a spring seat 14 formed in the tube and a spring seat 15 carried by the valve stem 4. This spring 13 coöperates with the valve stem 4 to yieldingly hold the gasket 9 on the valve seat 3. A cap 16, engaging the upper end of the tube 1, is screwed onto the upper end of the valve stem 4, so as to positively retain the gasket in engagement with the valve seat. It will be observed that the cap 16 can be rotated on the valve stem, with the result of firmly compressing the gasket onto the valve seat, and when this cap is removed from the device, the valve stem 4 can be pressed downwardly to remove the gasket from its seat, thereby opening the valve.

To positively prevent leakage of air under pressure from a pneumatic tire, the yielding gasket 9 should be very firmly pressed onto its seat, as suggested by Figs. I and II, and to accomplish this, the gasket is compressed between the pressure exerting head 7 and the valve seat. When subjected to pressure in this manner, the yielding gasket tends to expand circumferentially, but such expansion is limited, by the firm sheet metal confining ring A which contacts with the peripheral face of the gasket. By utilizing the confining ring A to prevent circumferential expansion of the gasket, I prevent the gasket from being flattened and otherwise mutilated by the severe compressive stresses to which it is subjected in tightly closing the valve. The confined gasket is thus protected from destructive stresses and it will retain its high efficiency for a very long period of time.

To prevent unlimited movement of the gasket when it is forced onto the valve seat, thereby preventing excessive cutting of the gasket at the valve seat, the abutment flange 10 is adapted to contact with the abutment 10', so as to limit the movement of the confining ring A. Although the pressure exerting head 7 is surrounded by the confining ring A, said head is preferably movable relative to the ring, and the head therefore constitutes a plunger whereby the gasket is firmly pressed onto its seat while the abutment flange 10 contacts with the abutment 10'. This feature is suggested by Figs. II and III. The contacting abutments 10 and 10' prevent excessive movement of the gasket when the latter is forced onto the valve seat 3, and the pressure head 7 can then move relative to confining ring A without subjecting the gasket to injurious mutilation.

When the valve stem 4 is forced downwardly to open the valve, the pressure exerting head 7 contacts with the inner face of flange 11 to positively transmit movement to the ring A containing the gasket, and the abutment flange 10 on the ring then coöperates with the shoulder 5 to positively withdraw the gasket from the valve seat 3. The gasket will usually tend to adhere to the valve seat, but the combination of elements just pointed out will most effectively coöperate with each other to remove the gasket from the seat, and this is accomplished without tearing or otherwise mutilating the yielding gasket.

Although the gasket and pressure head 7 are securely confined in the ring A, said ring is open at one side to expose the gasket to its seat, and open at the opposite side to expose the head 7 to the fluid under pressure which tends to close the valve. When the valve device is applied to a pneumatic tire, the air pressure acting on the pressure head 7 tends to force the confined gasket onto the valve seat 3.

Heretofore, pneumatic tires have been provided with small delicate check valve devices, including tiny unconfined gaskets which are forced onto their seats by means of weak springs. Experience has shown that the old delicate valve devices require frequent renewals and they are liable to result in slight leakage of air which soon reduces the air pressure in the tire. My object is to produce a strong and durable valve device including a yielding gasket adapted to be very firmly forced onto its seat, so as to positively prevent leakage of air, and capable of most effectively performing its functions for an indefinite period of time, without renewing the gasket or making repairs of any kind. This may be accomplished by confining the yielding gasket and by combining the confined gasket with other elements as herein pointed out.

I claim:

1. A valve device having a valve seat, a pressure member facing said valve seat, a valve in the form of a yielding gasket interposed between said valve seat and pressure member, a relatively firm confining shell surrounding said yielding gasket and contacting therewith to limit expansion thereof, said confining shell, yielding gasket and pressure member being movable toward said valve seat to engage the gasket therewith, and an abutment coöperating with said confining shell to stop the latter when said yielding gasket contacts with said valve seat, said pressure member being movable relative to said confining shell so as to firmly press said yielding gasket onto said valve seat while the shell is stopped by said abutment.

2. A check valve device having a valve seat, a pressure member facing said valve seat, a valve in the form of a yielding gasket interposed between said valve seat and pressure member, a relatively firm confining shell surrounding said yielding gasket and contacting therewith to limit expansion thereof, said confining shell being open at one side to expose the confined gasket to said valve seat and open at the opposite side to expose said pressure member to fluid pressure tending to close the valve, said confining shell, yielding gasket and pressure member being movable simultaneously toward said valve seat to engage the gasket therewith, and an abutment coöperating with said confining shell to stop the latter when the yielding gasket is in contact with said valve seat, said pressure member being surrounded by said confining shell and movable relative to said shell, so as to form a plunger whereby the confined gasket is firmly pressed onto said valve seat while the shell is stopped by said abutment.

3. A check valve device having a circular valve seat, an abutment outside of said circular valve seat, a pressure member facing said valve seat, a valve in the form of a yielding gasket interposed between said pressure member and valve seat, a relatively firm confining shell surrounding said yielding gasket and contacting therewith to limit expansion thereof, said confining shell being open at one side to expose the confined gasket to said valve seat and open at the opposite side to expose said pressure member to fluid pressure tending to close the valve, a valve operating stem passing through the confined yielding gasket and secured to said pressure member, said confining shell, yielding gasket and pressure member being movable simultaneously toward said valve seat to engage the gasket therewith, and an abutment carried by said confining shell and coöperating with the first mentioned abutment to stop the confining shell when the yielding gasket is in contact with said valve seat, said pressure member being surrounded by said confining shell and movable relative to said shell, so as to form a plunger whereby the confined gasket is pressed onto said valve seat while the shell is stopped by said abutments.

4. In a check valve device for pneumatic tires, a tube provided with a valve seat, a longitudinally movable valve operating stem in said tube, a pressure head facing said valve seat and rigidly secured to said stem, a circular rubber gasket surrounding said valve stem and located between said pressure head and valve seat, a relatively firm confining ring surrounding said head and rubber gasket and contacting with said gasket to limit circumferential expansion thereof, said confining ring having inturned marginal flanges between which the pressure head and rubber gasket are confined, one of said flanges being engaged with said gasket and the other flange being engaged with said pressure head, said pressure head being movable relative to said confining ring, so as to form a plunger whereby the confined rubber gasket is pressed onto said valve seat, and valve operating means associated with said valve stem to force the confined gasket onto said valve seat.

5. In a check valve device for pneumatic tires, a tube provided with a valve seat, a longitudinally movable valve operating stem in said tube, a pressure head facing said valve seat and rigidly secured to said stem, a circular rubber gasket surrounding said valve stem and located between said pressure head and valve seat, a relatively firm confining ring surrounding said head and rubber gasket and contacting with said gasket to limit circumferential expansion thereof, said confining ring having inturned marginal flanges between which the pressure head and rubber gasket are confined, one of said flanges being engaged with said gasket and the other flange being engaged with said pressure head, said pressure head having an extension surrounded by and located adjacent to the last mentioned flange, said pressure head being movable relative to said confining ring, so as to form a plunger whereby the confined rubber gasket is pressed onto said valve seat, and valve operating means associated with said valve stem to force the confined gasket onto said valve seat.

In testimony that I claim the foregoing I hereunto affix my signature.

HARRY E. HARDER.